US010822097B2

(12) United States Patent
Smith et al.

(10) Patent No.: US 10,822,097 B2
(45) Date of Patent: Nov. 3, 2020

(54) ICE FORMATION DETECTION AND REMOVAL SYSTEM FOR AN AERIAL VEHICLE AND METHOD

(71) Applicant: BOOZ ALLEN HAMILTON INC., McLean, VA (US)

(72) Inventors: Jared Smith, Albuquerque, NM (US); Christopher Andersen, Socorro, NM (US); Alex Baldonado, Socorro, NM (US); Francisco Hernandez, Santa Fe, NM (US); Francesca Jarrett, Albuquerque, NM (US); Andrea Salazar, El Paso, TX (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 368 days.

(21) Appl. No.: 15/897,741

(22) Filed: Feb. 15, 2018

(65) Prior Publication Data
US 2019/0248501 A1  Aug. 15, 2019

(51) Int. Cl.
*B64C 39/02* (2006.01)
*B64D 15/12* (2006.01)
*B64D 15/22* (2006.01)
*B64C 3/26* (2006.01)
*B64D 15/16* (2006.01)

(52) U.S. Cl.
CPC ............ *B64D 15/12* (2013.01); *B64C 3/26* (2013.01); *B64C 39/024* (2013.01); *B64D 15/16* (2013.01); *B64D 15/22* (2013.01); *B64C 2201/104* (2013.01)

(58) Field of Classification Search
CPC ..... B64C 3/26; B64C 2201/104; B64D 15/12; B64D 15/16; B64D 15/22

USPC ..................................................... 244/134 D
See application file for complete search history.

(56) References Cited

U.S. PATENT DOCUMENTS

| 4,766,369 A | 8/1988 | Weinstein |
| 8,931,740 B2 | 1/2015 | Nordin et al. |
| 9,199,741 B2 | 12/2015 | Sapper et al. |
| 2008/0250796 A1 | 10/2008 | Clugston et al. |
| 2009/0261811 A1 | 10/2009 | Gordon |

(Continued)

FOREIGN PATENT DOCUMENTS

EP   1204551 B1   7/2006

OTHER PUBLICATIONS

"*Battelle*", Anti-icing Technology, printed Oct. 17, 2017, pp. 1-6, <https://www.battelle.org/government-offerings/national-security/aerospace-systems/deicing-technology>.

(Continued)

*Primary Examiner* — Claude J Brown
(74) *Attorney, Agent, or Firm* — Buchanan Ingersoll & Rooney PC (57) ABSTRACT

A fixed-wing aerial vehicle includes: a fuselage with an on-board power supply; at least one fixed-wing or aerodynamic surface having at least one heater configured to be energized by the power supply, and having a superhydrophobic coating applied to at least a portion of the at least one fixed-wing or the aerodynamic surface that may be subject to icing; at least one capacitive sensor configured to detect ice formation on the at least one fixed-wing or aerodynamic surface; and a controller configured to selectively activate the at least one heater in response to detected ice formation.

19 Claims, 6 Drawing Sheets

(56) References Cited

U.S. PATENT DOCUMENTS

| | | | |
|---|---|---|---|
| 2014/0070054 A1 | 3/2014 | Burton et al. | |
| 2014/0191084 A1* | 7/2014 | Gambino | B64D 15/12 244/134 D |
| 2015/0035548 A1 | 2/2015 | Moser et al. | |
| 2015/0346122 A1 | 12/2015 | Stothers et al. | |
| 2016/0009400 A1 | 1/2016 | English et al. | |
| 2016/0362184 A1 | 12/2016 | Tanaka et al. | |
| 2016/0377487 A1* | 12/2016 | Cheung | G01K 13/02 374/141 |
| 2017/0002475 A1* | 1/2017 | Strobl | C25D 11/246 |
| 2017/0106585 A1 | 4/2017 | Nino et al. | |
| 2017/0158336 A1* | 6/2017 | Meis | B64D 15/22 |
| 2017/0204279 A1 | 7/2017 | Larimer et al. | |
| 2017/0308048 A1 | 10/2017 | Weber et al. | |
| 2018/0186460 A1* | 7/2018 | Dardona | C23C 4/12 |
| 2018/0215476 A1* | 8/2018 | Chee | C09D 175/04 |
| 2018/0305020 A1* | 10/2018 | Bullock | B64C 1/40 |
| 2019/0176994 A1* | 6/2019 | Burton | B64D 15/14 |
| 2020/0086999 A1* | 3/2020 | Jacob | H05B 1/0236 |

OTHER PUBLICATIONS

"De-icing with nanotubes", Engineering Notebook, Aerospace America, Jul.-Aug. 2016, pp. 12-14.

"1.4 Classification of the Unmanned Aerial Systems", GEOG 892 Geospatial Applications of Unmanned Aerial Systems (UAS), N.p., n.d., Jul. 24, 2017, <https://www.e-education.psu.edu/geog892/node/5>.

"U.S. Standard Atmosphere", The Engineering ToolBox, N.p., n.d., Jul. 24, 2017, <https://www.engineeringtoolbox.com/standard-atmosphere-d_604.html>.

"Air Pressure at Altitude Calculator", Mide Technology, N.p., n.d., Jul. 25, 2017, <https://www.mide.com/pages/air-pressure-at-altitude-calculator>.

"NOAA's Office of Satellite and Product Operations", US Department of Commerce, NOAA, National Environmental Satellite Data and Information Service, Office of Satellite and Product Operations, NUCAPS Animation, Office of Satellite and Product Operations, N.p., Mar. 16, 2012, accessed Jul. 25, 2017, <http://www.ospo.noaa.gov/Products/atmosphere/soundings/nucaps/NUCAPS_composite.html>.

Summary of Small Unmanned Aircraft Rule (Part 107), Washington, D.C., Federal Aviation Administration, Jun. 21, 2016, <https://www.faa.gov/uas/media/Part_107_Summary.pdf>.

Bart Jansen, "FAA approves first commercial drone over land", USA Today, Gannett Satellite Information Network, Jun. 10, 2014, accessed Jul. 18, 2017, <https://www.usatoday.com/story/money/business/2014/06/10/faa-drones-bp-oil-pipeline-aerovironment-northshore/10264197/.

BI Intelligence, "The Drones Report: Market forecasts, regulatory barriers, top vendors, and leading commercial applications", Business Insider, Jun. 10, 2016, accessed Jul. 12, 2017, <http://www.businessinsider.com/uav-or-commercial-drone-market-forecast-2015-2>.

Research and Markets, "Global UAV Market (2016-2020) Growth at 10.16%—Key Vendors are AeroVironment, Elbit Systems, General Atomics, Israel Aerospace Industries & Northrop Grumman", PR Newswire: news distribution, targeting and monitoring, PRNewswire, Feb. 1, 2016, accessed Jul. 25, 2017, <https://www.prnewswire.com/news-releases/global-uav-market-2016-2020-growth-at-1016---key-vendors-are-aerovironment-elbit-systems-general-atomics-israel-aerospace-industries--northrop-grumman-300212693.html>.

"Department of Defense Report to Congress on Future Unmanned Aircraft Systems Training, Operations, and Sustainability", Department of Defense, Under Secretary of Defense for Acquisition, Technology and Logistics, Apr. 2012, N.p.: n.p., n.d. PDF., <https://info.publicintelligence.net/DoD-FutureUAS.pdf>.

"Commercial UAV Market Analysis by Product (Fixed Wing, Rotary Blade, Nano, Hybrid), by Application (Agriculture, Energy, Government, Media & Entertainment) and Segment Forecasts to 2022", Commercial UAV Market Size & Analysis Research Report, 2022, N.p., Apr. 2016, accessed Jul. 25, 2017, <https://www.grandviewresearch.com/industry-analysis/commercial-uav-market>.

Jeremy Herb, "Congress proposes defense budget $37 billion higher than Trump's", CNN, Jun. 22, 2017, accessed Jul. 24, 2017, <http://www.cnn.com/2017/06/22/politics/congress-trump-defense-budget/index.html>.

"Battelle HeatCoat", Battelle 2017, accessed Jul. 24, 2017, <https://www.battelle.org/government-offerings/national-security/aerospace-systems/deicing-technology>.

"High Efficiency Coating for Electrical Heating", Carbo-e-Therm, N.p., n.d., accessed Jul. 25, 2017, <http://www.future-carbon.de/solutions/electrical-heating/carbo-e-therm/>.

"TKS Ice Protection Systems", CAV Ice Protection, N.p., n.d., accessed Jul. 25, 2017, <https://www.caviceprotection.com/products-services/ice-protection-systems>.

"UAS IPS—Ice Protection System", USATec, 2017, accessed Jul. 24, 2017, <https://www.usa.uastec.com/uas-ips>.

"Kelly Aerospace—Ideas That Fly", Aircraft Deicing, Ice Protection—Prevention, ThermaWing | Kelly Aerospace Thermal Systems, N.p., n.d., accessed Jul. 25, 2017, <http://www.kellyaerospace.com/thermawing-aircraft-deice.html.

Kim L. Sørensen, "Icing Protection Solution for Unmanned Aircraft", NTNU AMOS, 2017, accessed Jul. 24, 2017, <https://www.ntnu.edu/documents/20587845/1271655762/7+Kim+L.+S%C3%B8rensen.pdf/6d07d632-2c00-4d1e-9dd9-11484ab35f1d>.

"Unmanned Aerial Vehicle Systems", Prioria Robotics, N.p., n.d., accessed Jul. 25, 2017, <http://www.prioria.com/>.

"Delair-Tech", Delair-Tech, N.p., n.d., Jul. 25, 2017, <http://www.delair-tech.com/>.

"Altavian: Commercial Drones | UAV | Geospatial Data", Altavian Inc., N.p., n.d., accessed Jul. 25, 2017, <https://www.altavian.com/>.

"Visit Aerovironment Inc.", Aerovironment Inc., N.p., n.d., accessed Jul. 25, 2017, <https://www.avinc.com/>.

"UAV data analysis—smart data.", Delta Drone, N.p., n.d., accessed Jul. 25, 2017, <http://www.deltadrone.com/en/>.

"Boeing's Insitu, Textron's AAI each win $475 million U.S. defense contract: Pentagon", Reuters, Business News, Jun. 7, 2017, pp. 1-5, <https://www.reuters.com/article/us-insitu-aai-pentacion/boeings-insitu-textrons-aai-each-win-475-million-u-s-defense-contract-pentagon-idUSKBN18Y33R>.

David Wang, "Capacitive Proximity Sensing Using the FDC1004", Texas Instrumentals, Application Report, Apr. 2015, <http://www.ti.com/lit/an/snoa928a/snoa928a.pdf>.

David Wang, "Capacitive Sensing: Ins and Outs of Active Shielding", Texas Instruments, Application Report, Feb. 2015, <http://www.ti.com/lit/an/snoa926a/snoa926a.pdf>.

Marcus E. Hobbs, et al., "The Dielectric Constant of Liquid Water and Various Forms of Ice According to Significant Structure Theory", Departments of Chemistry, Duke University, Durham, NC, May 27, 1966, pp. 31-38, vol. 56, <http://europepmc.org/backend/ptpmcrender.fcgi?accid=PMC285670&blobtype=pdf>.

Frost & Sullivan Follow, "Superhydrophobic Coatings—The Road Ahead", LinkedIn SlideShare, N.p., Mar. 20, 2013, accessed Jul. 7, 2017, pp. 1-17, <https://www.slideshare.net/FrostandSullivan/superhydrophobic-coatings-the-road-ahead>.

"Chapter 10 Icing", FAA Advisory N.p., n.d., accessed Jul. 25, 2017, pp. 91-132, <https://www.faa.gov/documentLibrary/media/Advisory_Circular/AC%2000-6A%20Chap%2010-12.pdf>.

"Pilot Guide: Flight in Icing Conditions", U.S. Department of Transportation, Federal Aviation Administration, Advisory Circular, Oct. 8, 2015, accessed Jul. 25, 2017, pp. 1-63, <https://www.faa.gov/documentLibrary/media/Advisory_Circular/AC_91-74B.pdf>.

International Search Report and the Written Opinion of the International Searching Authority (Forms PCT/ISA/220, PCT/ISA/210 and PCT/ISA/237) dated May 8, 2019, by the International Bureau of United States Patent and Trademark Office in corresponding International Application No. PCT/US2019/017594. (11 pages).

\* cited by examiner

S500 — attaching a flexible laminate strip to a surface of a fixed-wing of the aerial vehicle at a position adjacent to a leading edge of the fixed-wing, wherein the laminate strip includes a heater and at least one capacitive sensor configured to detect ice formation on the fixed-wing S502 — spraying a portion of the fixed-wing with a superhydrophobic coating

ICE FORMATION DETECTION AND REMOVAL SYSTEM FOR AN AERIAL VEHICLE AND METHOD

FIELD

The present disclosure relates to an ice formation detection system for an aerial vehicle which also removes the formed ice.

BACKGROUND INFORMATION

Unmanned aerial vehicles (UAVs) are utilized throughout the world for a multitude of purposes, ranging from oil pipeline monitoring to military surveillance. UAVs are more efficient and cost effective than manned aircraft, as UAV operators can prioritize mission completion above all else. Because UAVs fly lower and longer than most manned aircraft, ice accretion poses an increased threat to the flight and mission performance of UAVs. Ice formed on the wing of an aerial vehicle destroys the smooth flow of air, increasing drag while decreasing the ability of the airfoil to create lift. Existing ice removal systems are too heavy and require too much power to be applied to the majority of UAVs, which are relatively small, with very limited excess power and weight margins.

U.S. Patent Publ. No. 2017/0204279 entitled "Stretchable Hydrophobic Materials and Methods for Making the Same" by Larimer et al. describes stretchable hydrophobic materials that can be applied to a manned or unmanned aerial vehicle or drone, allowing it to fly in inclement weather without the negative effects of water accumulation on electronic components or propellers.

U.S. Patent Publ. No. 2014/0070054 entitled "Anti-icing, De-icing, and Heating Configuration, Integration, and Power Methods for Aircraft, Aerodynamic, and Complex surfaces" by Burton et al. describes anti-icing methods and aerodynamic structures having laminated resistive heaters for de-icing. The laminated resistive heaters include a carbon nanotube layer.

U.S. Patent Publ. No. 2009/0261811 entitled "Aircraft Icing Sensor" by Gordon describes a sensor on an aircraft that detects changes in permittivity to sense the presence of ice. The sensor is co-located with a metal film heater.

U.S. Patent Publ. No. 2017/0106585 entitled "Printed Multifunctional Skin For Aerodynamic Structures, and Associated Systems and Methods" by Nino et al. describes sensors and actuators carried by an aircraft. The sensors (pressure sensors, temperature sensors, strain sensors, ice sensors, strain transducers, RF antennas, etc.) and actuators (e.g., heaters, ionic actuators, plasma actuators, miniature air blowers, etc.) may be built using 3D printing and may be printed directly over the aircraft structures or inside relatively shallow cavities of the aircraft structures.

U.S. Patent Publ. No. 2017/00308048 entitled "Magnetostrictive Multi-Frequency Guided Wave Ice Sensing Probe" by Borigo et al. describes systems and methods for detection of ice accretion on aircraft and other engineered structures for which ice detection is desired.

U.S. Patent Publ. No. 2015/0035548 entitled "Device for Detecting Critical States of a Surface" by Moser et al. describes a device for detecting critical states of a surface, in which at least one hermetically sealed sensor for detecting critical states of a surface, one system for energy supply and one device for data transfer with an at least partially flexible, thin carrier plate are mechanically connected, and said carrier plate is arranged on the surface to be observed.

U.S. Patent Publ. No. 2008/0250796 entitled "Device for Detecting Critical States of a Surface" by Moser et al. describes capacitive sensors for detecting the formation of ice in an ice maker.

A paper entitled "De-icing with Nanotubes" in Aerospace America, July-August 2016, pages 12-14, by Michael Peck describes coating the most vulnerable areas of airframes with carbon-nanotube molecules and heating them to melt ice.

SUMMARY

An exemplary embodiment of the present disclosure provides a fixed-wing aerial vehicle that includes: a fuselage with an on-board power supply; at least one fixed-wing or aerodynamic surface having at least one heater configured to be energized by the power supply, and having a superhydrophobic coating applied to at least a portion of the at least one fixed-wing or the aerodynamic surface that may be subject to icing; at least one capacitive sensor configured to detect ice formation on the at least one fixed-wing or aerodynamic surface; and a controller configured to selectively activate the at least one heater in response to detected ice formation.

An exemplary embodiment of the present disclosure provides a fixed-wing aerial vehicle that includes: a fuselage with an on-board power supply; at least one fixed-wing or aerodynamic surface having at least one carbon nanotube heater configured to be energized by the power supply, and having a superhydrophobic coating applied to at least a portion of the at least one fixed-wing or aerodynamic surface; a sensor configured to detect ice formation on the at least one fixed-wing or aerodynamic surface; and a controller configured to selectively activate the at least one heater in response to detected ice formation.

An exemplary embodiment of the present disclosure provides a method of preparing a fixed-wing aerial vehicle for ice management. The method includes attaching a flexible laminate strip to a surface of a fixed-wing of the aerial vehicle at a position adjacent to a leading edge of the fixed-wing. The laminate strip includes a heater and at least one capacitive sensor configured to detect ice formation on the fixed-wing. The method includes spraying a portion of the fixed-wing with a superhydrophobic coating.

BRIEF DESCRIPTION OF THE DRAWINGS

The scope of the present disclosure is best understood from the following detailed description of exemplary embodiments when read in conjunction with the accompanying drawings, wherein.

DETAILED DESCRIPTION

The present disclosure is directed to an ice formation detection and removal system for an aerial vehicle. The aerial vehicle can be, for example, a UAV. Small, fixed-wing UAVs do not have the payload capacity or electrical power required for conventional approaches to detect and eliminate ice accumulation during flight. The disclosed system provides a compact, low-power solution that is compatible with small UAV limitations. The power and weight constraints of UAVs are much more stringent than those of manned aircraft. The disclosed system autonomously detects the onset of icing and thermally detaches the ice, enabling flight in conditions that would normally not be possible.

In general, the area to start experiencing ice accretion is the place on an aerial vehicle where the smallest radius occurs. This radial area is the leading edge of an airfoil. Super cooled water droplets are struck by the leading edge of the airfoil, causing ice accretion to occur. Ice accretion is normally seen in two different forms, rime ice and clear/glaze ice. Rime ice typically occurs with temperatures between −15° C. and −20° C. This ice forms when the water droplets freeze on impact with the surface. This instantaneous freezing of the water droplets traps air in the ice and makes the ice white in color. Clear ice is formed when temperatures are around 2° C. to −10° C. and with the presence of large water droplets that can include freezing drizzle, or freezing rain. Clear ice is the more dangerous type of ice due to the shapes that it can form on the airfoil; one of these being a horn formation. These buildups of ice cause a separation of the airflow that creates lift for the aircraft. The turbulent boundary layer is increased until complete flow separation occurs and causes the aircraft to stall in flight. The buildup doesn't just decrease lift; it also increases drag and increases the chances of stalling.

Figure 1A:
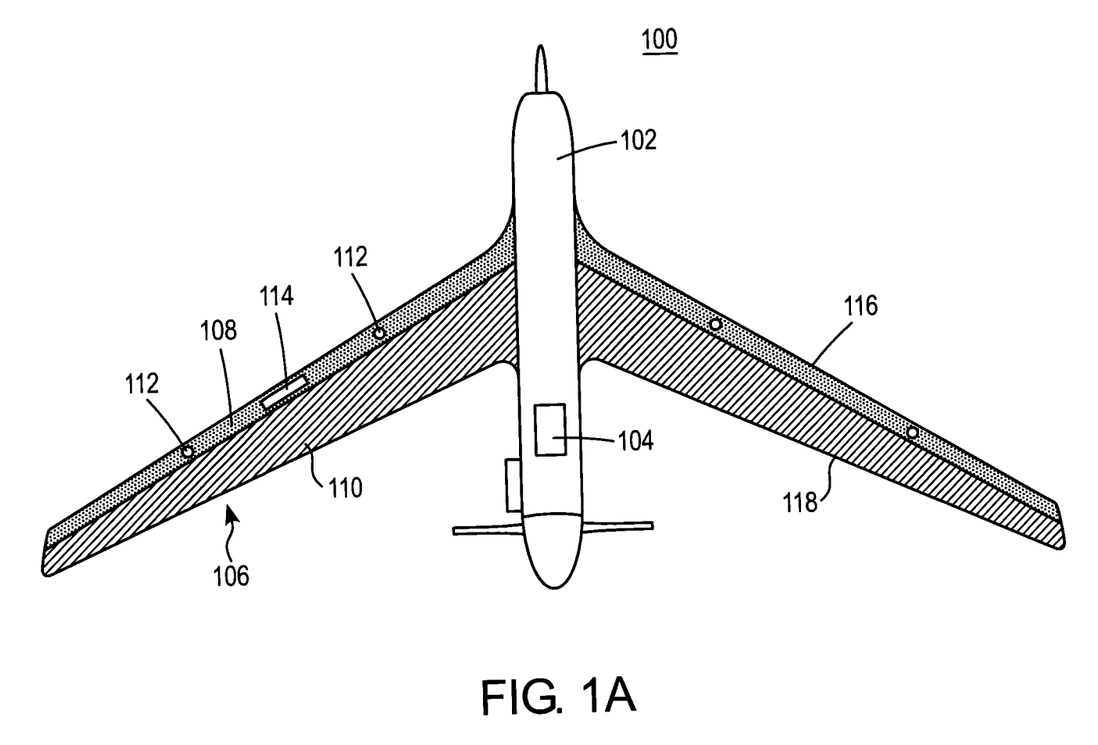
FIG. 1A illustrates an overhead view of a fixed-wing aerial vehicle in accordance with an exemplary embodiment.

FIG. 1A illustrates an overhead view of a fixed-wing aerial vehicle 100 in accordance with an exemplary embodiment. In an exemplary embodiment, the aerial vehicle is a fixed-wing UAV (e.g., a Class I UAV, Class II UAV, Class III UAV, Class IV UAV, Class V UAV, etc.). The fixed-wing aerial vehicle 100 includes a fuselage 102 with an on-board power supply 104, and at least one fixed-wing 106 or aerodynamic surface having at least one heater 108 configured to be energized by the power supply 104, and having a superhydrophobic coating 110 applied to at least a portion of the at least one fixed-wing 106 or the aerodynamic surface that may be subject to icing. The superhydrophobic coating 110 can be applied by spraying it onto the portion of the fixed-wing 106 or aerodynamic surface. The fixed-wing aerial vehicle 100 also includes at least one capacitive sensor 112 configured to detect ice formation on the at least one fixed-wing 106 or aerodynamic surface; and a controller 114 configured to selectively activate the at least one heater 108 in response to detected ice formation. The capacitive sensor 112 can have a parallel-plate configuration. The controller 114 can be a standalone controller that is separate from any controller of the aerial vehicle 100. Thus, in an exemplary embodiment, the controller 114 does not interface with the aerial vehicle systems. Alternatively, the controller 114 can interface with the aerial vehicle systems. For example, if the controller 114 and other components receive power from the aerial vehicle's power supply. The controller 114 can be located anywhere on the aerial vehicle 100. For example, the controller 114 can be located anywhere on the fixed-wing 106 as shown in FIG. 1A or located anywhere in or on the fuselage 102 of the aerial vehicle 100. The controller 114 as discussed herein may be a single hardware processor, a plurality of hardware processors, or combinations thereof. Hardware processor devices may have one or more processor "cores." The power supply 104 can be the existing power supply of the aerial vehicle 100, or can be a separate power supply that only supplies power to the ice formation detection and removal system. The power supply 104 can be located within the aerial vehicle 100 or can be attached to the exterior of the aerial vehicle 100 and contained in an enclosure.

In an exemplary embodiment, the at least one heater 108 is made of carbon nanotube material. The carbon nanotube material can be, for example, carbon nanotubes suspended in carbon black. The carbon nanotubes suspended in carbon black become conductive after curing. The resistance of the carbon nanotube material is a function of the thickness, size, and distance of the electrical leads. When a voltage is applied, the material begins to heat up quickly and can provide deicing. In an exemplary embodiment, the at least one heater 108 is made from graphene and carbon black.

Figure 1B:
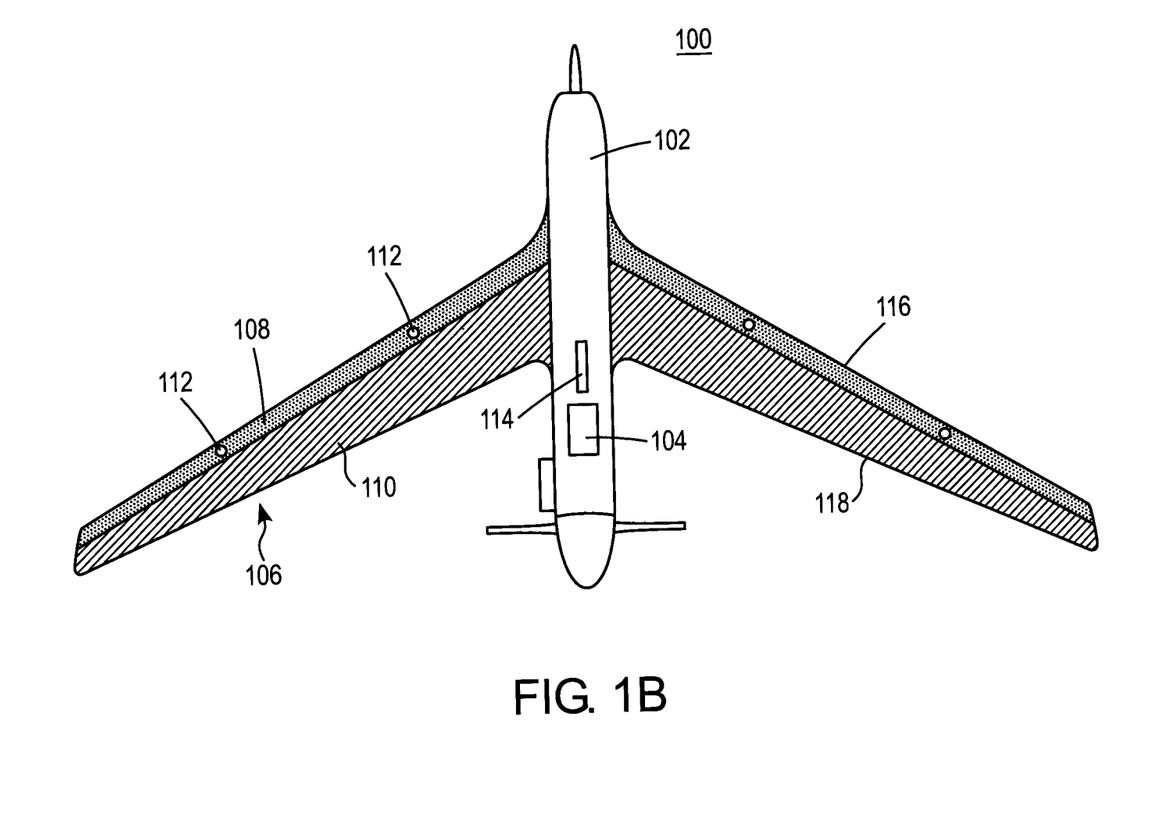
FIG. 1B illustrates an overhead view of a fixed-wing aerial vehicle in accordance with an exemplary embodiment.

In an exemplary embodiment, the at least one heater 108 can be a strip as shown in FIGS. 1A and 1B that is located at a leading edge 116 of the fixed-wing 106 and extends the full span of the fixed-wing 106 or less than the full span of the fixed-wing 106. However, the shape of the at least one heater 108 is not limited to a strip, but rather can be any other shape (e.g., a shape with one or more curved edges, etc.). In an exemplary embodiment, the at least one heater 108 is conformal to at least the surface at the leading edge 116 of the fixed-wing 106, and extends along the upper and lower surfaces of the fixed-wing 106.

Figure 3:
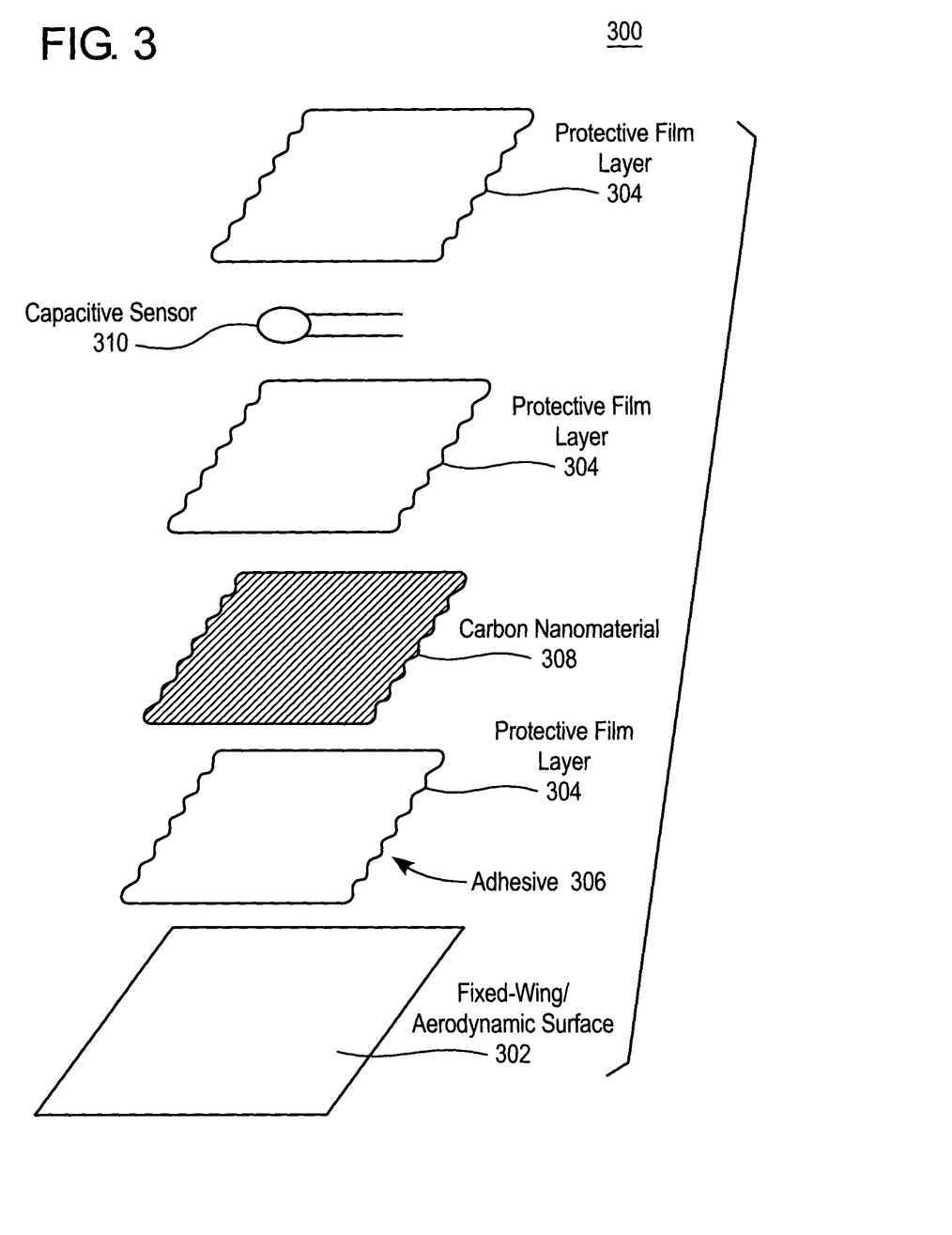
FIG. 3 illustrates layers applied to a wing in accordance with an exemplary embodiment.

In an exemplary embodiment, the strip is a multi-layered, flexible laminate that includes the at least one capacitive sensor 112 and an adhesive layer 306 for attaching the flexible laminate strip to the fixed-wing 106 or aerodynamic surface. The construction 300 of a strip is shown in detail in FIG. 3. This figure shows a fixed-wing/aerodynamic surface 302 of the aerial vehicle 100. A protective film layer 304 (i.e., a first protective film layer) is located on the top surface of the fixed-wing/aerodynamic surface 302, and is applied thereto with an adhesive 306 that is present on the bottom surface of the protective film layer 304. A carbon nanomaterial layer 308 is located above the protective film layer 304. Another protective film layer 304 (i.e., a second protective film layer) is located above the carbon nanomaterial layer 308. A capacitive sensor 310 is located above the second protective film layer 304. As a material comes near or on the capacitive sensor 310 it disrupts the electric field lines and a capacitance change is measured. The dielectric constant of this material determines how greatly the field lines are disrupted and the resulting change in the measured capacitance. Water and ice have dielectric constants that differ from one another and vary with their temperatures. The dielectric constant of ice increases as the temperature of the ice decreases and the dielectric constant of water decreases as the temperature of the water increases. Thus, knowledge of the ambient temperature and capacitance changes enables a determination that icing is occurring. Yet another protective film layer 304 (i.e., a third protective film layer) is located above the capacitive sensor 310. Thus, the capacitive sensors 112 and wires are integrated into the heater strip 108 (i.e., an adhesive laminate). The protective film layers are thermally conductive. The heater strip 108 is flexible and conformal to the aerial vehicle's surfaces. FIG. 1A shows that each wing has two capacitive sensors 112. However, this is illustrative and the disclosed system is not limited to two capacitive sensors 112 on each wing. Any number of capacitive sensors 112 can be used.

In an exemplary embodiment, the heater strip 108 occupies up to 15 percent of the surface area of the fixed-wing 106 or the aerodynamic surface. In an exemplary embodiment, the heater strip 108 occupies up to 30 percent of the surface area of the fixed-wing 106 or the aerodynamic surface. In an exemplary embodiment, the heater strip 108 has a width of approximately 20 mm, and when it is wrapped around the leading edge 116 of the fixed-wing 106, the depth of the heater strip 108 on the upper surface of the fixed-wing 106 is approximately 10 mm, and the depth of the heater strip 108 on the lower surface of the fixed-wing 106 is approximately 10 mm.

In an exemplary embodiment shown in FIGS. 1A and 1B, the portion of the fixed-wing 106 or aerodynamic surface that the superhydrophobic coating 110 is applied to is adjacent to and contiguous with the heater 108. In an exemplary embodiment, the portion of the fixed-wing 106 that the superhydrophobic coating 110 is applied to is adjacent to and contiguous with the heater 108 and extends to the trailing edge of the fixed-wing 106. In an exemplary embodiment, the superhydrophobic coating 110 is applied to surfaces of the fixed-wing 106 or the aerodynamic surface that are not covered by the at least one heater 108, which are downstream from an area where the at least one heater is located. Thus, it is possible that the superhydrophobic coating 110 does not extend all the way to the trailing edge, i.e. there is a portion or portions of the wing that are not covered by the heater strip 108 or the superhydrophobic coating 110.

The superhydrophobic coating 110 prevents adhesion of water to the fixed-wing 106 or aerodynamic surface. For example, the superhydrophobic coating 110 eliminates "run back" icing. "Run back" icing is when the water that was produced from the melted ice by the heater strip 108 re-freezes on the wing aft of the heater 108. The superhydrophobic coating on the exposed wing sections also limits impact icing.

In an exemplary embodiment, a fixed-wing aerial vehicle 100 includes a fuselage 102 with an on-board power supply 104; and at least one fixed-wing 106 or aerodynamic surface having at least one carbon nanotube heater 108 configured to be energized by the power supply 104, and having a superhydrophobic coating 110 applied to at least a portion of the at least one fixed-wing 106 or aerodynamic surface. The fixed-wing aerial vehicle 100 also includes a sensor 112 configured to detect ice formation on the at least one fixed-wing 106 or aerodynamic surface, and a controller 114 configured to selectively activate the at least one heater 108 in response to detected ice formation. The superhydrophobic coating 110 can be a commercially available sprayable superhydrophobic coating, for example from Rust-Oleum®. In an exemplary embodiment, the superhydrophobic coating 110 can also be applied to the surface of the heater 108 (i.e., heater strip).

Figure 2:
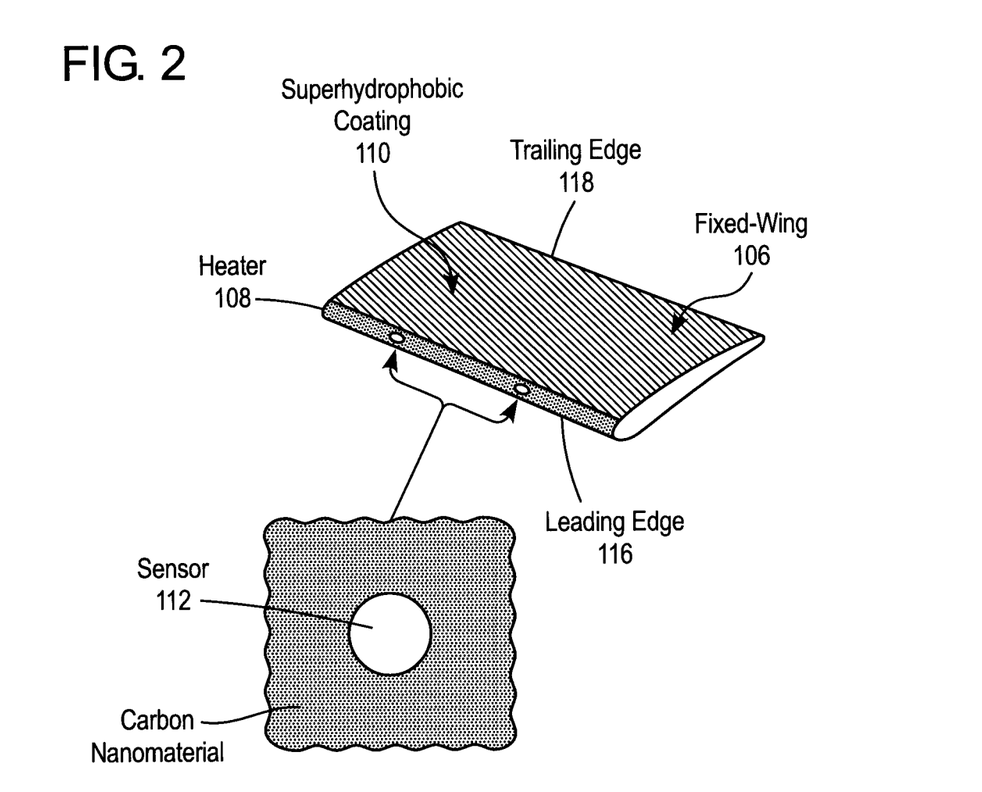
FIG. 2 illustrates a portion of a wing in accordance with an exemplary embodiment.

FIG. 2 shows a cutaway portion of the fixed-wing 106. The leading edge 116 of the fixed-wing 106 is the forward edge in the direction of air travel and the trailing edge 118 is the rearward edge in the direction of air travel. As seen in FIG. 2, the capacitive sensors 112 are not covered up by the carbon nanomaterial.

In an exemplary embodiment, the sensor 112 is a capacitive sensor, and the carbon nanotube heater 108 is a strip that is located at a leading edge 116 of the fixed-wing 106 and extends the full span of the fixed-wing 106 or less than the full span of the fixed-wing 106.

In an exemplary embodiment, the carbon nanotube heater 108 is conformal to at least the surface at the leading edge 116 of the fixed-wing 106 and extends along the upper and/or lower surfaces of the fixed-wing 106.

Figure 4:
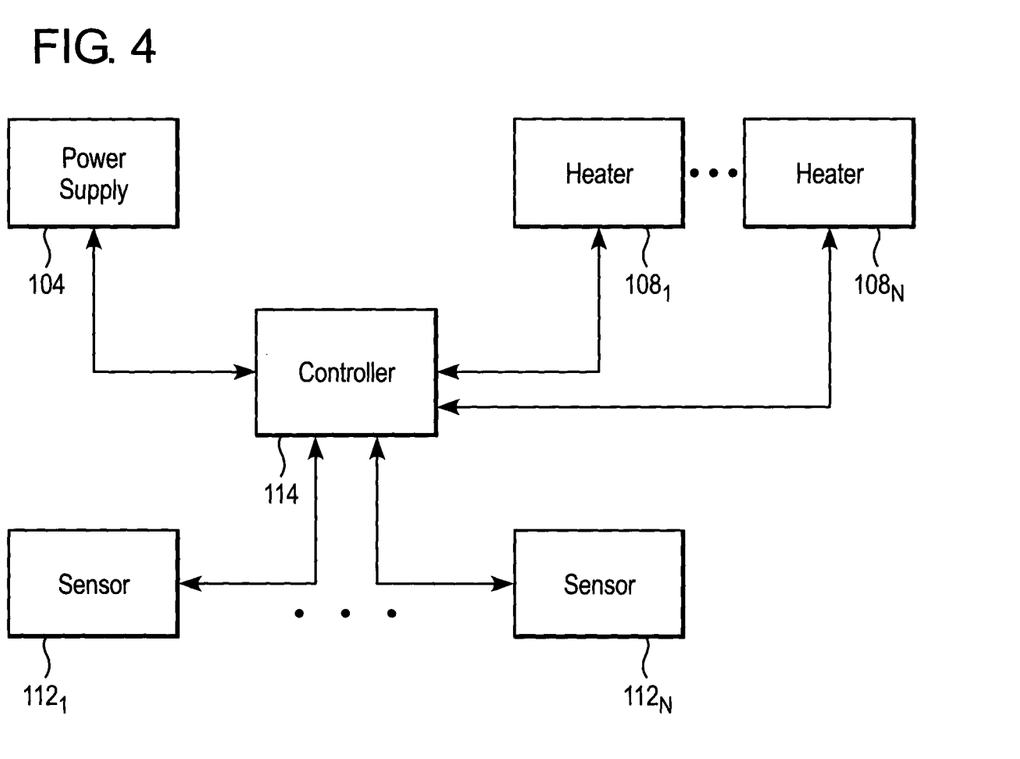
FIG. 4 is a block diagram illustrating a system hardware architecture in accordance with an exemplary embodiment.

FIG. 4 is a block diagram illustrating a system hardware architecture in accordance with an exemplary embodiment. This figure illustrates the electrical interconnections of the components of the system. The power supply 104, sensors $112_1$ to $112_N$ (where N is any number), and heaters $108_1$ to $108_N$ (where N is any number) are each connected to the controller 114. All electrical connections are hidden and protected by the layered film, allowing easy application with minimal electrical connections. The capacitive sensors 112 are used in a control loop that turns on the power supply for the heater/heaters 108 when ice accretion is detected. In an exemplary embodiment, the controller 114 turns off the power supply for the heater/heaters 108 when ice accretion is no longer detected. Thus, ice is autonomously detected and removed. Because the heaters 108 are only powered on when ice is detected, power stored in the power supply 104 is conserved. In an exemplary embodiment, the power consumption of the disclosed system can be 13 Watts or less. In an exemplary embodiment, the weight of the system can be 300 grams or less. In an exemplary embodiment, the weight of the system can be 150 grams or less.

The ice formation detection and removal system for an aerial vehicle is a complete retrofit that can be applied to any aerial vehicle. FIGS. 1A and 1B show one heater strip 108 per fixed-wing 106, but it is possible that each wing could have several heater strips 108 that are individually powered on based on detection of ice by one or more associated capacitive sensors 112.

Figure 5:
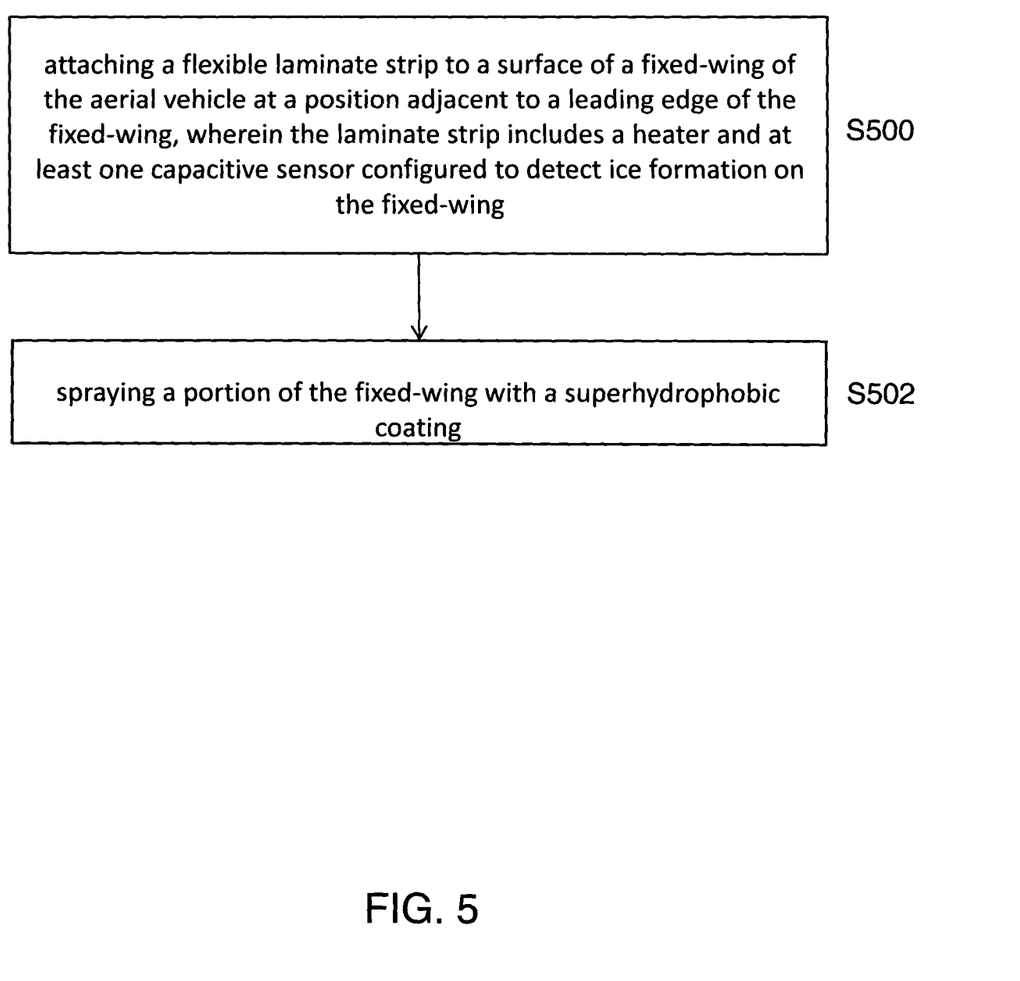
FIG. 5 is a flow chart illustrating a method according to an exemplary embodiment.

FIG. 5 illustrates an exemplary method of preparing a fixed-wing aerial vehicle 100 for ice management. The method includes, in step S500, attaching a flexible laminate strip to a surface of a fixed-wing 106 of the aerial vehicle 100 at a position adjacent to a leading edge 116 of the fixed-wing 106. The laminate strip includes a heater 108 and at least one capacitive sensor 112 configured to detect ice formation on the fixed-wing 106. The method includes, in step S502, spraying a portion of the fixed-wing 106 with the superhydrophobic coating 110.

In an exemplary embodiment, the spraying of the superhydrophobic coating 110 includes covering an entire area of a top surface of the fixed-wing 106, from a trailing edge 118 of the fixed-wing 106 to an edge of the laminate strip that is located on the top surface of the fixed-wing 106. In an exemplary embodiment, the aerial vehicle that the method is applied to is an unmanned aerial vehicle.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

What is claimed is:

1. A fixed-wing aerial vehicle, comprising:
a fuselage with an on-board power supply;
at least one fixed-wing or aerodynamic surface having at least one heater configured to be energized by the power supply, and having a superhydrophobic coating applied to at least a portion of the at least one fixed-wing or the aerodynamic surface that may be subject to icing;
at least one capacitive sensor configured to detect ice formation on the at least one fixed-wing or aerodynamic surface; and
a controller configured to selectively activate the at least one heater in response to detected ice formation;
wherein the superhydrophobic coating is applied to surfaces of the fixed-wing or aerodynamic surface that are not covered by the at least one heater, which are downstream from an area where the at least one heater is located.

2. The aerial vehicle of claim 1, wherein the at least one heater is made of carbon nanotube material.

3. The aerial vehicle of claim 2, wherein the at least one heater is a strip that is located at a leading edge of the fixed-wing and extends the full span of the fixed-wing or less than the full span of the fixed-wing.

4. The aerial vehicle of claim 3, wherein the at least one heater is conformal to at least the surface at the leading edge of the fixed-wing, and extends along the upper and lower surfaces of the fixed-wing.

5. The aerial vehicle of claim 3, wherein the strip is a multi-layered, flexible laminate that includes the at least one capacitive sensor and an adhesive layer for attaching the strip to the fixed-wing or aerodynamic surface.

6. The aerial vehicle of claim 3, wherein the heater strip occupies up to 15 percent of the surface area of the fixed-wing or the aerodynamic surface.

7. The aerial vehicle of claim 1, wherein the portion of the fixed-wing or aerodynamic surface that the superhydrophobic coating is applied to is adjacent to and contiguous with the heater.

8. The aerial vehicle of claim 1, wherein the portion of the fixed-wing that the superhydrophobic coating is applied to is adjacent to and contiguous with the heater and extends to the trailing edge of the fixed-wing.

9. The aerial vehicle of claim 1, wherein the at least one heater includes a first protective layer disposed on the at least one fixed-wing or aerodynamic surface, a carbon nanomaterial layer disposed on the first protective layer, a second protective layer disposed on the carbon nanomaterial layer, and the capacitive sensor placed on top of the second protective layer.

10. The aerial vehicle of claim 1, wherein the superhydrophobic coating prevents adhesion of water to the fixed-wing or aerodynamic surface.

11. The aerial vehicle of claim 1, wherein the aerial vehicle is a fixed-wing unmanned aerial vehicle.

12. A fixed-wing aerial vehicle, comprising:
a fuselage with an on-board power supply;
at least one fixed-wing or aerodynamic surface having at least one carbon nanotube heater configured to be energized by the power supply, and having a superhydrophobic coating applied to at least a portion of the at least one fixed-wing or aerodynamic surface;
a sensor configured to detect ice formation on the at least one fixed-wing or aerodynamic surface; and
a controller configured to selectively activate the at least one heater in response to detected ice formation;
wherein the superhydrophobic coating is applied to surfaces of the fixed-wing or aerodynamic surface that are not covered by the at least one carbon nanotube heater, which are downstream from an area where the at least one carbon nanotube heater is located.

13. The aerial vehicle of claim 12, wherein the sensor is a capacitive sensor, and the carbon nanotube heater is a strip that is located at a leading edge of the fixed-wing and extends the full span of the fixed-wing or less than the full span of the fixed-wing.

14. The aerial vehicle of claim 13, wherein the carbon nanotube heater is conformal to at least the surface at the leading edge of the fixed-wing and extends along the upper and/or lower surfaces of the fixed-wing.

15. The aerial vehicle of claim 12, wherein the superhydrophobic coating prevents adhesion of water to the fixed-wing or aerodynamic surface.

16. The aerial vehicle of claim 12, wherein the aerial vehicle is an unmanned aerial vehicle.

17. A method of preparing a fixed-wing aerial vehicle for ice management, the method comprising:
attaching a flexible laminate strip to a surface of a fixed-wing of the aerial vehicle at a position adjacent to a leading edge of the fixed-wing, wherein the laminate strip includes a heater and at least one capacitive sensor configured to detect ice formation on the fixed-wing; and
spraying a portion of the fixed-wing with a superhydrophobic coating so that the superhydrophobic coating is applied to surfaces of the fixed-wing or aerodynamic surface that are not covered by the heater, which are downstream from an area where the heater is located.

18. The method of claim 17, wherein the spraying of the superhydrophobic coating includes covering an entire area of a top surface of the fixed-wing, from a trailing edge of the fixed-wing to an edge of the laminate strip that is located on the top surface of the fixed-wing.

19. The method of claim 17, wherein the aerial vehicle is an unmanned aerial vehicle.

* * * * *